US010843700B2

(12) United States Patent
Laur et al.

(10) Patent No.: US 10,843,700 B2
(45) Date of Patent: Nov. 24, 2020

(54) VEHICLE SYSTEM AND METHOD FOR STEEP SLOPE SITE AVOIDANCE

(71) Applicant: Aptiv Technologies Limited, St. Michael (BB)

(72) Inventors: Michael H. Laur, Mission Viejo, CA (US); Nandita Mangal, Palo Alto, CA (US); Colton Gorman Stearns, Los Altos Hills, CA (US); Nilesh Gupta, Fremont, CA (US)

(73) Assignee: Aptiv Technologies Limited, St. Michael (BB)

( * ) Notice: Subject to any disclaimer, the term of this patent is extended or adjusted under 35 U.S.C. 154(b) by 174 days.

(21) Appl. No.: 16/165,068

(22) Filed: Oct. 19, 2018

(65) Prior Publication Data

US 2020/0122738 A1 Apr. 23, 2020

Related U.S. Application Data

(60) Provisional application No. 62/746,888, filed on Oct. 17, 2018.

(51) Int. Cl.
*B60W 50/00* (2006.01)
*B60G 17/00* (2006.01)

(52) U.S. Cl.
CPC ......... *B60W 50/0098* (2013.01); *B60G 17/00* (2013.01); *B60G 2400/82* (2013.01);
(Continued)

(58) Field of Classification Search
CPC ......... B60W 50/0098; B60W 2555/20; B60W 2555/00; B60W 2500/30; B60W 2710/22; B60G 17/00; B60G 2400/82
See application file for complete search history.

(56) References Cited

U.S. PATENT DOCUMENTS

2010/0235053 A1* 9/2010 Iwakiri ............... B62D 15/027
701/42
2011/0276209 A1* 11/2011 Suganuma ........... B60W 20/12
701/22

(Continued)

FOREIGN PATENT DOCUMENTS

WO 2017/205822 A1 11/2017

OTHER PUBLICATIONS

European Search Report for Application No. 19201704, European Patent Office, dated Feb. 24, 2020.

*Primary Examiner* — Thomas E Worden
(74) *Attorney, Agent, or Firm* — Colby Nipper PLLC

(57) ABSTRACT

A system for operating a vehicle includes a perception sensor, vehicle controls, a controller circuit, and a leveling actuator. The perception sensor is operable to determine a slope of an area within an operable range of a vehicle. The vehicle controls are operable to control movement of the vehicle. The controller circuit is in communication with the perception sensor, the vehicle controls, and the leveling actuator. The controller circuit is configured to determine, using the perception sensor, a first slope of a first site within the area to stop the vehicle, and compare the first slope to a slope threshold. In response to a determination that the first slope is steeper than the slope threshold, the controller circuit is configured to access a digital map that indicates a plurality of slopes coinciding with a plurality of locations at least comprising a second site characterized by a second slope that is not steeper than the slope threshold. The controller circuit is also configured to operate the vehicle controls to move the vehicle to the second site, and to operate the leveling actuator to level the vehicle based on the second slope upon stopping the vehicle at the second site.

20 Claims, 3 Drawing Sheets

(52) U.S. Cl.
CPC ..... *B60G 2500/30* (2013.01); *B60W 2555/00* (2020.02); *B60W 2555/20* (2020.02); *B60W 2710/22* (2013.01)

(56) References Cited

U.S. PATENT DOCUMENTS

| | | |
|---|---|---|
| 2014/0297116 A1 | 10/2014 | Anderson et al. |
| 2017/0090480 A1 | 3/2017 | Ho et al. |
| 2018/0229988 A1* | 8/2018 | Gault ...................... B66F 9/075 |
| 2018/0244278 A1 | 8/2018 | Shami et al. |
| 2019/0083334 A1* | 3/2019 | MacPherson .......... A61G 3/067 |
| 2020/0039361 A1* | 2/2020 | Geller ................... B60L 3/0061 |
| 2020/0064831 A1* | 2/2020 | Pedersen ................ G01C 21/26 |

* cited by examiner

VEHICLE SYSTEM AND METHOD FOR STEEP SLOPE SITE AVOIDANCE

TECHNICAL FIELD OF INVENTION

This disclosure generally relates to a system for operating a vehicle, and more particularly relates to a system that determines a first-slope of a first-site to pick-up or drop-off a client of the host-vehicle, and selects a second-site to pick-up or drop-off the client when the first-slope is steeper than a slope-threshold.

BRIEF DESCRIPTION OF DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
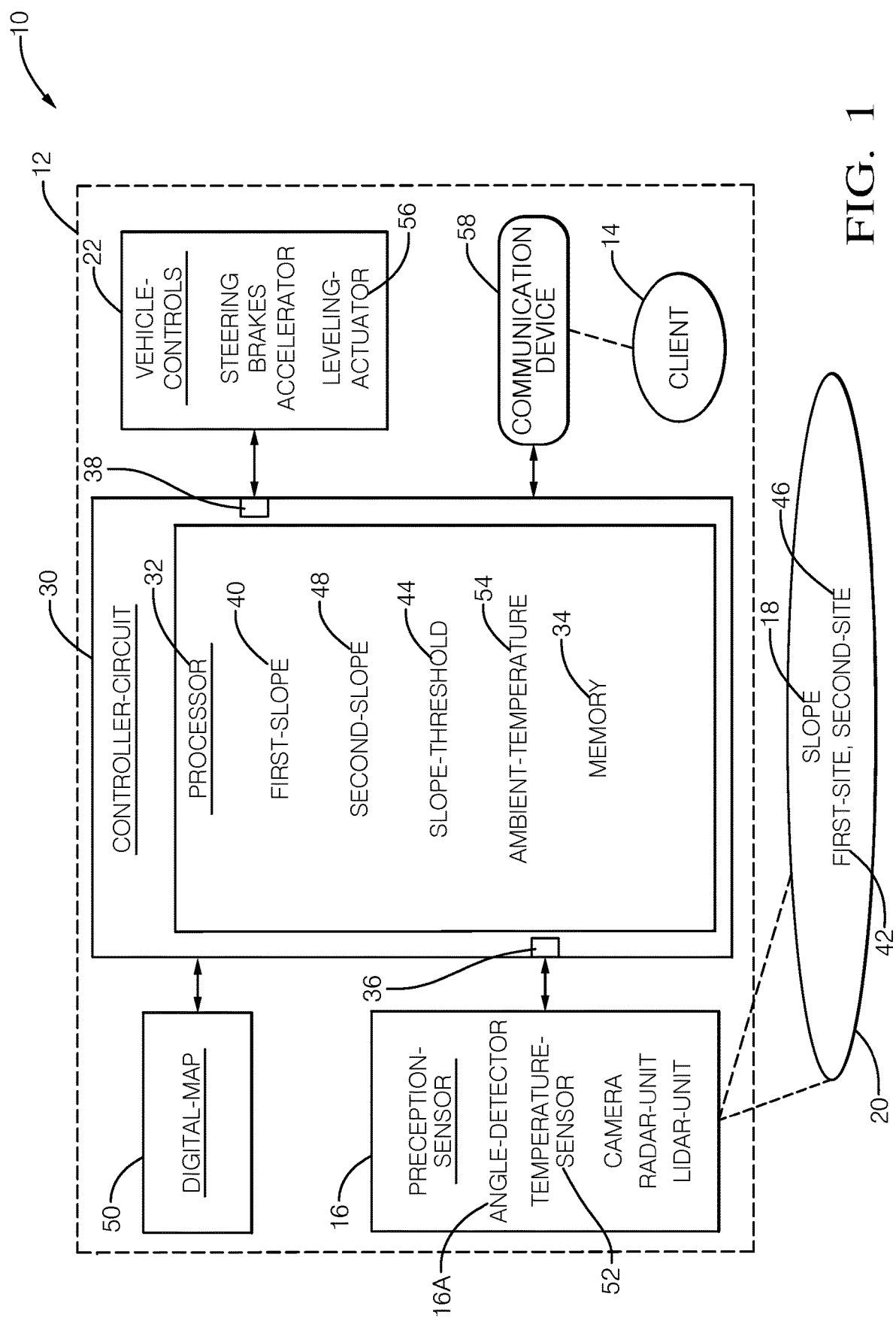
FIG. 1 is a diagram of a system for operating a vehicle in accordance with one embodiment.

FIG. 1 illustrates a non-limiting example of a system 10 for operating a vehicle, e.g. a host-vehicle 12. As will be explained in more detail below, the system 10 operates the host-vehicle 12 to avoid picking-up or dropping-off a client 14, i.e. a passenger or customer, at locations (i.e. a pick-up site or a drop-off site) where the ground or surface is considered to be too steeply sloped for easy and/or safe ingress (i.e. entering) or egress (i.e. exiting) of the host-vehicle by the client 14. While the non-limiting example of FIG. 1 shows the client 14 as being within the host-vehicle 12, possibly preparing to exit the host-vehicle 12, the alternative where the client is outside of the host-vehicle and possibly preparing to enter the host-vehicle is also contemplated.

The host-vehicle 12 may be characterized as an automated vehicle, and may be referred to by some as an automated-mobility-on-demand (AMOD) type of vehicle. As used herein, the term automated vehicle may apply to instances when the host-vehicle 12 is being operated in an automated-mode, i.e. a fully autonomous mode, where a human-operator (not shown) of the host-vehicle 12 may do little more than designate a destination to operate the host-vehicle 12. However, full automation is not a requirement. It is contemplated that the teachings presented herein are useful when the host-vehicle 12 is operated in a manual-mode where the degree or level of automation may be little more than providing an audible or visual guidance to the human-operator who is generally in control of the steering, accelerator, and brakes of the host-vehicle 12.

The system 10 includes a perception-sensor 16 operable to, among other functions, determine a slope 18 of an area 20 proximate to (i.e. underneath or nearby, e.g. within 75 meters) the host-vehicle 12. The perception-sensor 16 may include or consist of, but is not limited to, one or more instances of a camera, a radar-unit, a lidar-unit, or any combination thereof. Examples of these devices that are suitable for use on the host-vehicle 12 are commercially available, as will be recognize by those in the automated vehicle or autonomous vehicle arts. The perception-sensor 16 may also include an angle-detector 16A, e.g. a vehicle-angle-detector, that can be used to determine the slope 18 of the area 20. The slope 20 may be based on the angle (e.g. pitch-angle, roll-angle, compound-angle) of the host-vehicle 12 and/or the devices (camera, radar-unit, lidar-unit) mounted on the host-vehicle, and may be expressed as an angle relative to the direction of gravity or level, e.g. a plane oriented normal to the direction of gravity. By way of example and not limitation, the angle-detector 16A may be attached to the frame of the host-vehicle 12, or integrated into the camera, radar-unit, or lidar-unit. Alternatively, the slope 20 may be determined or calculated using image interpolation.

The system 10 also includes vehicle-controls 22 operable to control or actuate, for example, the steering, brakes, and accelerator of the host-vehicle, and thereby control movement of the host-vehicle 12. The means for computer control of these aspects of vehicle operation are known and are commercially available.

The system 10 also includes a controller-circuit 30 in communication with the perception-sensor 16 via an input 36 and the vehicle-controls 22 via an output 38. The communication may be by way of, but not limited to, wires, optical-fiber, or wireless communications. The input 36 and the output 38 may be configured to send/receive analog and/or digital signals. The controller-circuit 30, hereafter sometimes referred to as the controller 30, may include one or more instances of a processor 32 such as one or more instances of a microprocessor or other control circuitry such as analog and/or digital control circuitry including an application specific integrated circuit (ASIC) for processing data as should be evident to those in the art. While the system 10 described herein is generally described in terms of having a single instance of the controller 30, it is recognized that the functions of the controller 30 may be shared or distributed among several instances of controllers that are each configured for some specific task. Hereafter, any reference to the controller 30 being configured for something is to also be interpreted as suggesting that the processor 32 may also be configured for the same thing. It is also recognized that there may be multiple instances of processors in any instance of the controller 30.

The controller 30 may include memory 34, i.e. non-transitory computer-readable storage-medium, including non-volatile memory, such as electrically erasable programmable read-only memory (EEPROM) for storing one or more routines, thresholds, and captured data. The memory 34 may be part of the processor 32, or part of the controller 30, or separate from the controller 30 such as remote memory stored in the cloud. The one or more routines may be executed by the controller 30 or the processor 32 to perform steps for determining the slope 18 based on signals received by the controller 30 from the perception-sensor 16 as described herein.

Figure 2:
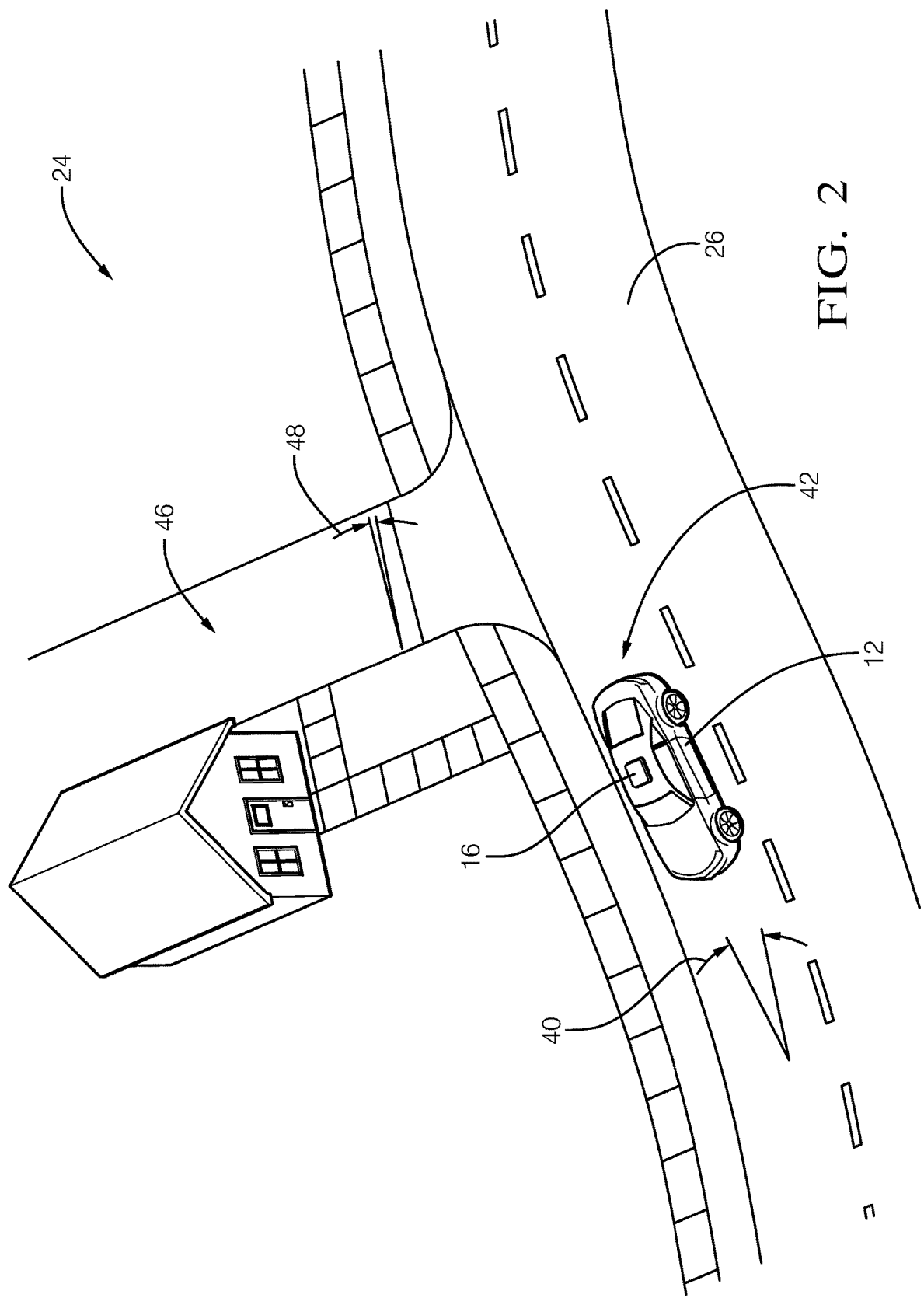
FIG. 2 is a scenario encountered by the system of FIG. 1 in accordance with one embodiment.

FIG. 2 illustrates a non-limiting example of a scenario 24 where the roadway 26 at a destination has a relatively steep slope, e.g. twenty-five-degrees of angle (25° L) with respect to level. For any one or more of numerous reasons, it may be difficult for the client 14 (not shown in FIG. 2) to enter or exit the host-vehicle 12 while the host-vehicle 12 is stopped where the slope 18 is relatively steep. Possible reasons include, but are not limited to, the client 14 being aged and/or disabled, and/or the client 14 is carrying multiple packages, and/or the roadway 26 is slippery because of water, ice, or snow. As will become clear in the description that follows, the system 10 described herein is an improvement over prior systems in that when the system 10 determines or detects that the slope 18 is relatively steep, the system 10 takes action to find an alternative location for the client 14 to enter or exit the host-vehicle 12, where the slope 18 of the alternative location is more level, i.e. not relatively steep.

To this end, the controller-circuit 30 (or the processor 32) is configured (e.g. programmed) to determine a first-slope 40 of a first-site 42 (i.e. an initial or preferred site, e.g. a spot on the roadway 26 that corresponds to the address of the client) to pick-up or drop-off a client 14 of the host-vehicle 12. The first-slope 40 may be merely what is indicated by the angle-detector 16A, or may be based on what is indicated by the angle-detector 16A combined with other information from the camera, radar-unit, and/or lidar-unit, where the information may be collected by the perception-sensor 16 as the host-vehicle 12 approaches the first-site 42.

The controller-circuit 30 is further configured to compare the first-slope 40 to the slope-threshold 44, e.g. twenty-one-degrees of angle (21° L). The comparison may be done using known algorithms (not shown) and/or an arithmetic-logic-unit (not shown) of the controller 30. In response to a determination that the first-slope 40 is steeper than the slope-threshold 44, the controller 30 seeks to select a second-site 46 to pick-up or drop-off the client 14, where the second-site 46 is characterized by a second-slope 48 that is not steeper than the slope-threshold 44. In one embodiment, the system 10 may use the camera, radar-unit, and/or lidar-unit of the perception-sensor 16 to visually search for or scan for some nearby surface that is less steep. In the non-limiting example of FIG. 2, a second-site 46 which is a nearby instance of a driveway with access to the roadway 26 can be 'seen' by the perception-sensor 16 from the first-site 42 or as the host-vehicle 12 passed by the end of the driveway. Using data from the perception-sensor 16, a second-slope 48 of the second-site 46 can be estimated using known image/radar-map/lidar cloud-point data processing algorithms.

In an alternative embodiment, the system 10 includes a digital-map 50 (FIG. 1) that may indicate a slope of a location, e.g. the second-slope of the second-site 46, or merely indicate locations where the slope 18 is less steep than the slope-threshold 44. Accordingly, the controller-circuit 30 may be configured to access the digital-map 50 to select the second-site 46 in response to the determination that the first-slope 40 is steeper than the slope-threshold 44. Regardless of what process/information is used to select the second-site 46 and determine the second-slope 48, the controller 30 is further configured to operate the vehicle-controls 22 to move (i.e. drive) the host-vehicle 12 to the second-site 46. Upon arrival at the second-site 46, it is contemplated that the angle-detector 16A may again be used to verify the value of the second-slope 48.

It is contemplated that the slope-threshold 44 may be varied in accordance with various ambient conditions. For example, the slope-threshold 44 may be decreased, i.e. a more level site is required, if the ambient lighting is low (e.g. night time), and/or the presence of ice/snow is detected or suspected. For example, the slope-threshold 44 may be varied in accordance with temperature as an ambient temperature below freezing (less than 0° C.) may result in water on the ground being frozen. Accordingly, in one embodiment, the system 10 includes a temperature-sensor 52 that indicates an ambient-temperature 54 of the area 20 proximate to the host-vehicle 12. The temperature-sensor may be included in the perception-sensor 16 as suggested by FIG. 1, or may be a remote sensor that is part of a weather-detection-system so the ambient-temperature 54 is communicated to the host-vehicle 12 by way of, for example, a Wi-Fi network or cellular-telephone-network. It follows that the controller-circuit 30 is configured to adjust the slope-threshold 44 in accordance with the ambient-temperature 54. For example, the slope-threshold 44 may be set to twenty-one-degrees of angle (21° L) if/when the ambient-temperature 54 is not below freezing (not less than 0° C.), and fifteen-degrees of angle (15° L) if/when the ambient-temperature 54 is below freezing (less than 0° C.). That is, the controller-circuit 30 may be configured to decrease the slope-threshold 44 in response to a determination that the ambient-temperature 54 has decreased to less than zero-degrees-Celsius (0° C.).

In addition to checking the slope 18 and, if necessary or desirable, searching for level ground, the system 10 may include a leveling-actuator 56 operable to level the host-vehicle 12. Leveling the host-vehicle 12 may be of further assistance to the client 14 for entering or exiting the host-vehicle 12. By way of example, the leveling-actuator 56 may include independently operable air-shocks so both the pitch-angle (front/back angle) and/or the roll-angle (side-to-side angle) of the host-vehicle 12 can be adjusted so the host-vehicle 12 is more level even though the ground is not level, i.e. sloped. It follows that the controller-circuit 30 may be configured to operate the leveling-actuator 56 to level the host-vehicle 12 to pick-up or drop-off the client 14.

Figure 3:
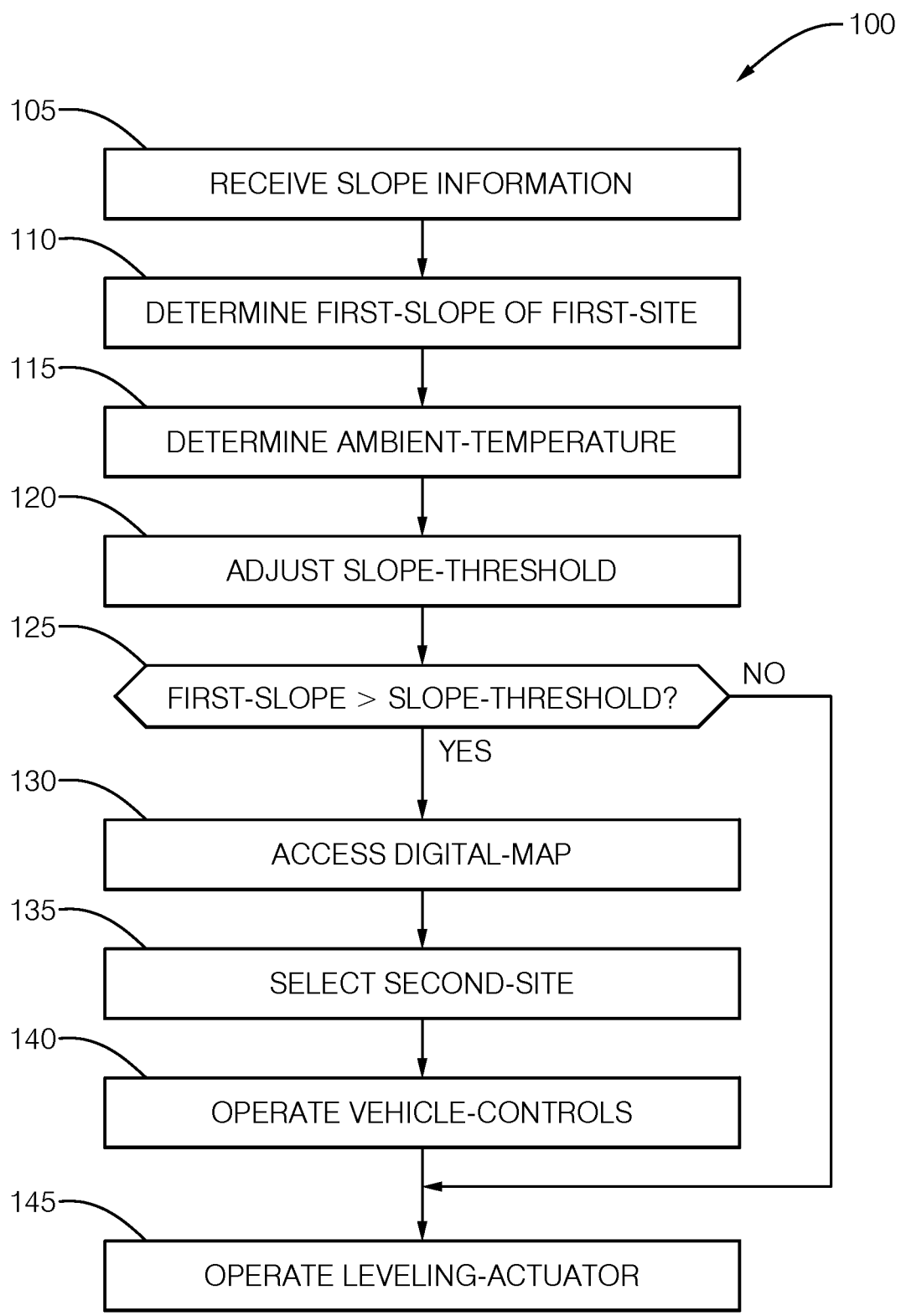
FIG. 3 is a method of operating the system of FIG. 1 in accordance with one embodiment.

FIG. 3 illustrates a non-limiting example of a method 100 for operating a vehicle, e.g. the host-vehicle 12. It is contemplated that some of the steps of the method 100 shown may be deleted, and others may be added, and/or the steps may be reordered, and the benefits of the system 10 described above will still be realized.

Step 105, RECEIVE SLOPE INFORMATION, may include receiving from a perception-sensor 16 an indication of a slope 18 of an area 20 proximate to a host-vehicle 12. The perception-sensor 16 may include an angle-sensor 16A that, for example, indicates the angle (relative to the direction of gravity) of the frame of host-vehicle 12, or indicates the angle one or more other devices that form the perception-sensor 16 such as, for example, one or more instances of a camera, a radar-unit, and/or a lidar-unit.

Step 110, DETERMINE FIRST-SLOPE OF FIRST-SITE, may include determining a first-slope 40 of a first-site 42 to pick-up or drop-off a client 14 of the host-vehicle 12 based on the angle indicated by the angle-sensor 16A and/or data/information from the one or more instances of a camera, a radar-unit, and/or a lidar-unit.

Step 115, DETERMINE AMBIENT-TEMPERATURE, is an optional step that may include receiving from a temperature-sensor 52 an indication of an ambient-temperature 54 of the area 20 proximate to the host-vehicle 12. Alternatively, the ambient-temperature may be determined by the controller 30 accessing a weather web-site via a Wi-Fi transceiver (not shown).

Step 120, ADJUST SLOPE-THRESHOLD, may include adjusting the slope-threshold 44 in accordance with detected conditions such as ambient-lighting, the ambient-temperature 54, and/or a physical assessment of the client 14. That is, in the presence of some conditions, it is contemplated that even more level ground is preferred, so the value of the slope-threshold 44 may be decreased from typical. For example, the step may include decreasing the slope-threshold 44 in response to a determination that the ambient-temperature 54 has decreased to less than zero-degrees-Celsius (0° C.).

Step 125, FIRST-SLOPE>SLOPE-THRESHOLD?, may include comparing by the controller 30 or the processor 32 the numerical value of the first-slope 40 to the numerical value of the slope-threshold 44, where level ground is indicated as having a slope of zero-degrees of angle (0° L).

Step 130, ACCESS DIGITAL-MAP, is an optional step may include accessing a digital-map 50 to select the second-site 46 in response to the determination that the first-slope 40 is steeper than the slope-threshold 44. The digital-map may be stored in the controller 30 or stored "in the cloud" and accessed via a Wi-Fi or cellular network.

Step 135, SELECT SECOND-SITE, may include in response to a determination that the first-slope 40 is steeper than the slope-threshold 44, selecting a second-site 46 to pick-up or drop-off the client, said second-site 46 characterized by a second-slope 48 that is not steeper than the slope-threshold 44. The criteria for selecting the second-site 46 may include, but is not limited to, limiting the distance from the first-site 42 to the second-site 46, or increasing the slope-threshold 44 as the distance to potential candidates for the second-site 46 increases.

Step 140, OPERATE VEHICLE-CONTROLS, may include operating the vehicle-controls 22 to move the host-vehicle 12 to the second-site 46. As part of initiating the move to the second-site 46, the client 14 may be informed or authorization by the client 14 may be requested. Accordingly, the system 10 may include a communications-device 58 such as speaker/microphone, display/touch-screen, or blue-tooth connection to a smart-phone carried by the client 14 that can communicate to the client 14 why the host-vehicle 12 is moving and/or request permission to execute the move to the second-site 46.

Step 145, OPERATE LEVELING-ACTUATOR, is an optional step that may include operating a leveling-actuator 56 to level the host-vehicle 12 to pick-up or drop-off the client 14. This may occur at the first-site 42 if the first-slope 40 is less than the slope-threshold 44 or the client 14 refuses the option to move to the second-site 46, or the host-vehicle 12 arrives at the second-site 46.

Described herein is a first device 30 that includes one or more processors 32; memory 34; and one or more programs 105-145 stored in memory 34. The one or more programs 105-145 including instructions for performing all or part of the method 100. Also, described herein is a non-transitory computer-readable storage-medium 34 that includes one or more programs 105-145 for execution by one or more processors 32 of a first device 30, the one or more programs 105-145 including instructions which, when executed by the one or more processors 32, cause the first device to perform all or part of the method 100.

Accordingly, a system 10, a controller 30 and/or a processor 32 for the system 10, and a method 100 of operating the system 10 are provided. The system 10 attempts to avoid situations where the client 14 must enter or exit the host-vehicle 12 at locations where the ground under the host-vehicle 12 is so steeply sloped that it may be difficult for the client to safely or easily enter or exit the host-vehicle 12.

While this invention has been described in terms of the preferred embodiments thereof, it is not intended to be so limited, but rather only to the extent set forth in the claims that follow.

We claim:

1. A system for operating a vehicle, the system comprising:
   a perception sensor operable to determine a slope of an area within an operable detection range of the perception sensor;
   vehicle controls operable to control movement of the host vehicle;
   a leveling actuator operable to level the vehicle; and
   a controller circuit in communication with the perception sensor, the vehicle controls, and the leveling actuator, said controller circuit configured to:
   determine a first need for stopping the vehicle;
   determine, using the perception sensor and based on the slope of the area, a first slope of a first site to stop the vehicle, the first site being within the area;
   compare the first slope to a slope threshold;
   in response to a determination that the first slope is steeper than the slope threshold, access a digital map that indicates a plurality of slopes at a plurality of locations at least comprising a second site characterized by a second slope that is not steeper than the slope threshold;

operate the vehicle controls to move the vehicle to the second site, and
operate the leveling actuator to level, based on the second slope, the vehicle upon stopping the vehicle at the second site.

2. The system in accordance with claim 1, wherein:
the system further comprises a temperature sensor that indicates an ambient temperature of the area within the operable detection range of the perception sensor; and
the controller circuit is further configured to adjust the slope threshold in accordance with the ambient temperature.

3. The system in accordance with claim 2, wherein the controller circuit is further configured to decrease the slope threshold in response to a determination that the ambient temperature has decreased to less than zero-degrees Celsius (0° C.).

4. The system in accordance with claim 1, wherein:
the system further comprises the digital map; and
the controller circuit is further configured to:
once the vehicle is stopped at the second site, determine, using the perception sensor, a new slope of the second site, the second site being within the area;
determine whether a difference between the second slope of the second site according to the digital map and the new slope of the second site as determined by the perception sensor is or is not within a predetermined tolerance threshold; and
responsive to a determination that the difference is not within the predetermined tolerance threshold, determine at least one of a second need to verify the second slope of the second site within the digital map or a third need to verify that the perception sensor is calibrated properly.

5. The system in accordance with claim 3, wherein the controller circuit is further configured to increase the slope threshold in response to a determination that the ambient temperature has increased to more than zero-degrees Celsius (0° C.).

6. The system in accordance with claim 1, wherein:
the system further comprises an ambient light sensor that indicates an ambient lighting of the first site; and
the controller circuit is further configured to adjust the slope threshold in accordance with the ambient lighting.

7. The system in accordance with claim 1, wherein the vehicle is an automated vehicle.

8. A controller circuit for operating a vehicle, the controller circuit comprising:
an input configured to communicate with a perception sensor operable to determine a slope of an area within an operable detection range of the perception sensor;
an output configured to communicate with vehicle controls and a leveling actuator of the vehicle, said vehicle controls operable to control movement of the vehicle, and said leveling actuator operable to level the vehicle; and
a processor in communication with the perception sensor, said processor configured to:
determine a first need for stopping the vehicle;
determine, using the perception sensor and based on the slope of the area, a first slope of a first site to stop the vehicle, the first site being within the area;
compare the first slope to a slope threshold;
in response to a determination that the first slope is steeper than the slope threshold, access a digital map that indicates a plurality of slopes at a plurality of locations at least comprising a second site characterized by a second slope that is not steeper than the slope threshold;
operate the vehicle controls to move the vehicle to the second site; and
operate the leveling actuator to level, based on the second slope, the vehicle upon stopping the vehicle at the second site.

9. The controller circuit in accordance with claim 8, wherein the processor is further configured to:
communicate with a temperature sensor that indicates an ambient temperature of the area within the operable detection range of the perception sensor; and
adjust the slope threshold in accordance with the ambient temperature.

10. The controller circuit in accordance with claim 9, wherein the processor is further configured to decrease the slope threshold in response to a determination that the ambient temperature has decreased to less than zero-degrees Celsius (0° C.).

11. The controller circuit in accordance with claim 8, wherein:
the controller circuit further comprises the digital map; and
the processor is further configured to:
once the vehicle is stopped at the second site, determine, using the perception sensor, a new slope of the second site, the second site being within the area;
determine whether a difference between the second slope of the second site according to the digital map and the new slope of the second site as determined by the perception sensor is or is not within a predetermined tolerance threshold; and
responsive to a determination that the difference is not within the predetermined tolerance threshold, determine at least one of a second need to verify the second slope of the second site within the digital map or a third need to verify that the perception sensor is calibrated properly.

12. The controller circuit in accordance with claim 10, wherein the processor is further configured to increase the slope threshold in response to a determination that the ambient temperature has increased to more than zero-degrees Celsius (0° C.).

13. The controller circuit in accordance with claim 8, wherein the processor is further configured to:
communicate with an ambient light sensor that indicates an ambient lighting of the first site; and
adjust the slope threshold in accordance with the ambient lighting.

14. The controller circuit in accordance with claim 8, wherein the vehicle is an automated vehicle.

15. A method for operating a vehicle, the method comprising:
determining a first need for stopping the vehicle;
receiving from a perception sensor an indication of a slope of an area within an operable detection range of the perception sensor;
determining, using the perception sensor and based on the slope of the area, a first slope of a first site to stop the vehicle, the first site being within the area;
comparing the first slope to a slope threshold;
in response to a determination that the first slope is steeper than the slope threshold, accessing a digital map that indicates a plurality of slopes at a plurality of locations at least comprising a second site characterized by a second slope that is not steeper than the slope threshold;

operating vehicle controls to move the vehicle to the second site; and operating a leveling actuator to level, based on the second slope, the vehicle upon stopping the vehicle at the second site.

16. The method in accordance with claim 15, wherein the method further comprises:

receiving from a temperature sensor an indication of an ambient temperature of the area within the operable detection range of the perception sensor; and adjusting the slope threshold in accordance with the ambient temperature.

17. The method in accordance with claim 16, wherein the method further comprises:

decreasing the slope threshold in response to a determination that the ambient temperature has decreased to less than zero-degrees Celsius (0° C.).

18. The method in accordance with claim 15, wherein the method further comprises:

once the vehicle is stopped at the second site, determining, using the perception sensor, a new slope of the second site, the second site being within the area;

determining whether a difference between the second slope of the second site according to the digital map and the new slope of the second site as determined by the perception sensor is or is not within a predetermined tolerance threshold; and responsive to a determination that the difference is not within the predetermined tolerance threshold, determining at least one of a second need to verify the second slope of the second site within the digital map or a third need to verify that the perception sensor is calibrated properly.

19. The method in accordance with claim 17, wherein the method further comprises:

increasing the slope threshold in response to a determination that the ambient temperature has increased to more than zero-degrees Celsius (0° C.).

20. The method in accordance with claim 15, wherein the method further comprises:

receiving from an ambient light sensor an indication of an ambient lighting of the first site; and adjusting the slope threshold in accordance with the ambient lighting.

* * * * *